United States Patent
Munjal et al.

(10) Patent No.: US 8,468,380 B2
(45) Date of Patent: Jun. 18, 2013

(54) POWER CONSUMPTION MONITOR AND METHOD THEREFOR

(75) Inventors: Ashish Munjal, Round Rock, TX (US); Alan Brumley, Cedar Park, TX (US); Jaydev Reddy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 401 days.

(21) Appl. No.: 12/533,905

(22) Filed: Jul. 31, 2009

(65) Prior Publication Data

US 2011/0029798 A1    Feb. 3, 2011

(51) Int. Cl.
*G06F 1/00*    (2006.01)
*G06F 11/30*    (2006.01)

(52) U.S. Cl.
USPC ............... 713/340; 713/300; 702/57; 702/58; 702/60; 702/61; 702/62

(58) Field of Classification Search
USPC .................. 713/300, 340; 702/57–58, 60–62
See application file for complete search history.

(56) References Cited

U.S. PATENT DOCUMENTS

| | | | |
|---|---|---|---|
| 6,052,281 A | 4/2000 | Hardt et al. | |
| 6,853,546 B2 | 2/2005 | Rabinovitz | |
| 6,856,508 B2 | 2/2005 | Rabinovitz | |
| 6,859,882 B2 | 2/2005 | Fung | |
| 7,032,119 B2 | 4/2006 | Fung | |
| 7,046,682 B2 * | 5/2006 | Carpenter et al. | 370/401 |
| 7,100,056 B2 | 8/2006 | Barr et al. | |
| 7,134,011 B2 | 11/2006 | Fung | |
| 7,188,003 B2 * | 3/2007 | Ransom et al. | 700/286 |
| 7,272,735 B2 | 9/2007 | Fung | |
| 7,463,986 B2 * | 12/2008 | Hayes | 702/62 |
| 7,502,698 B2 * | 3/2009 | Uenou et al. | 702/60 |
| 7,533,283 B2 | 5/2009 | Fung | |
| 7,617,406 B2 * | 11/2009 | Yasuo | 713/320 |
| 8,001,403 B2 * | 8/2011 | Hamilton et al. | 713/320 |
| 8,102,277 B2 * | 1/2012 | Giubbini | 340/870.02 |
| 2002/0007464 A1 | 1/2002 | Fung | |
| 2004/0268159 A1 * | 12/2004 | Aasheim et al. | 713/300 |
| 2006/0001414 A1 * | 1/2006 | Angerame et al. | 324/103 R |
| 2006/0248324 A1 | 11/2006 | Fung | |
| 2006/0265609 A1 | 11/2006 | Fung | |
| 2007/0061435 A1 | 3/2007 | Di Cristofano | |
| 2007/0101173 A1 | 5/2007 | Fung | |
| 2007/0124253 A1 * | 5/2007 | Angerame et al. | 705/63 |
| 2007/0186121 A1 * | 8/2007 | Yasuo | 713/320 |
| 2007/0241739 A1 * | 10/2007 | Uenou et al. | 324/76.17 |
| 2008/0106146 A1 * | 5/2008 | Baek et al. | 307/35 |
| 2009/0089604 A1 * | 4/2009 | Malik et al. | 713/340 |
| 2010/0179893 A1 * | 7/2010 | Burke et al. | 705/31 |
| 2010/0211669 A1 * | 8/2010 | Dalgas et al. | 709/224 |
| 2010/0222847 A1 * | 9/2010 | Goetz | 607/60 |
| 2010/0250440 A1 * | 9/2010 | Wang et al. | 705/63 |
| 2011/0140911 A1 * | 6/2011 | Pant et al. | 340/870.02 |

* cited by examiner

*Primary Examiner* — Jaweed A Abbaszadeh
(74) *Attorney, Agent, or Firm* — Larson Newman, LLP

(57) ABSTRACT

A power supply unit of an information handling system determines that a power consumption module of the information handling system is available. If the power consumption module is available, the power supply unit measures input power of the power supply unit and provides a representation of the input power to the power consumption module in response to receiving a power measurement request from the power consumption module. If the power supply unit determines that the power consumption module is not available, the power supply unit measures input power of the power supply unit and stores a representation of the input power at the power supply unit independent of a power measurement request from the power consumption module.

20 Claims, 5 Drawing Sheets

POWER CONSUMPTION MONITOR AND METHOD THEREFOR

FIELD OF THE DISCLOSURE

This disclosure relates generally to information handling systems, and more particularly relates to monitoring power consumption in information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system may include a large number of individual servers and associated storage and peripheral devices. A significant portion of the cost of operating and maintaining an information handling system can be associated with the electrical power consumed by the equipment. Businesses that provide computational services, such as data centers, therefore may choose to pass along energy costs to their clients. To do so, the power consumption of the information handling system often is recorded by a centralized controller. However, the centralized controller can fail or may be taken off-line, thereby resulting in the loss of power consumption information for the duration that the centralized controller is inoperable or absent from the information handling system. This loss of power consumption information can render it difficult to accurately determine the energy costs of operating the information handling system.

BRIEF DESCRIPTION OF THE DRAWINGS

Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings certainly can be utilized in this application.

Figure 1:
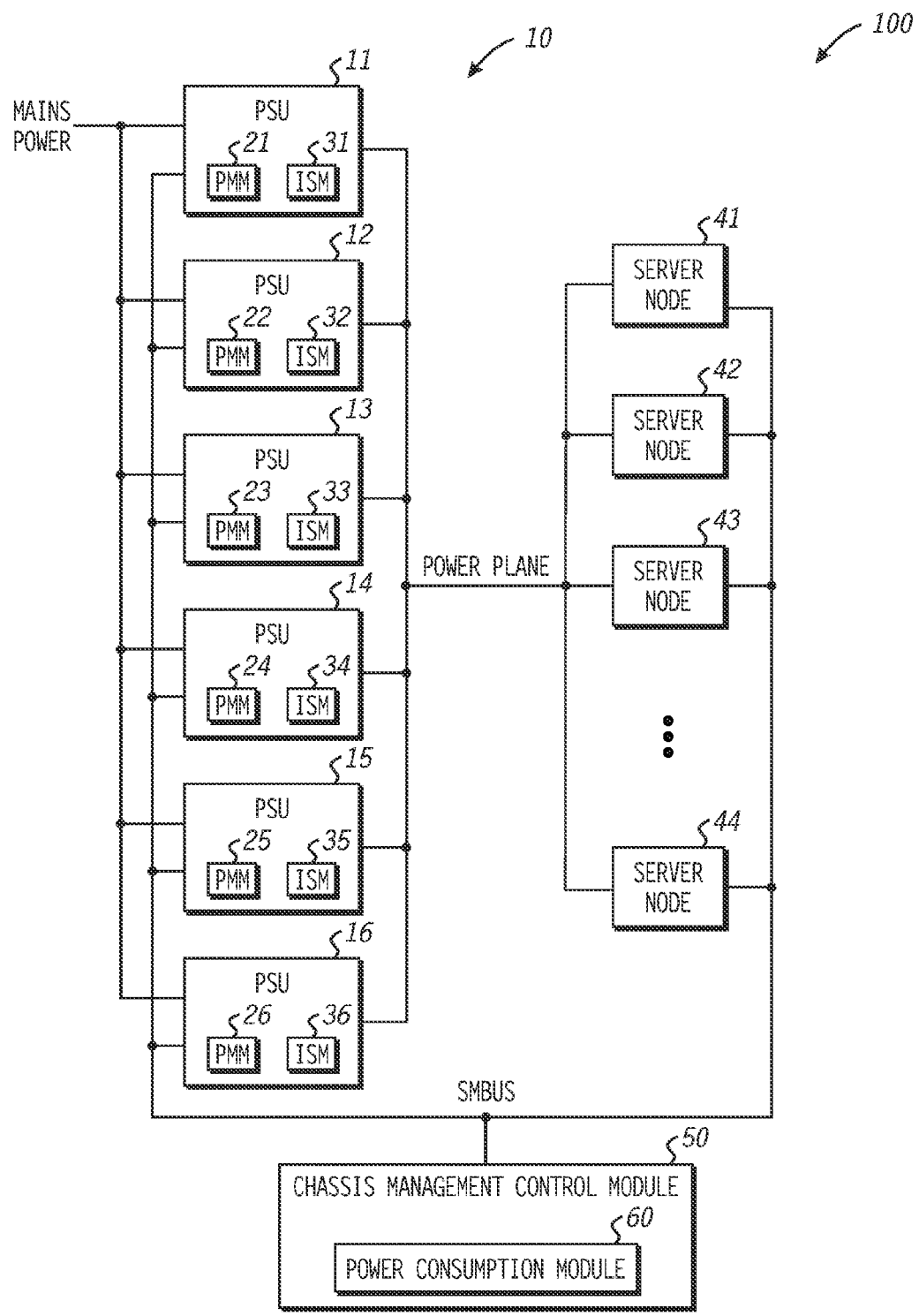
FIG. 1 is a block diagram illustrating an information handling system in accordance with a specific embodiment of the present disclosure.

FIG. 1 illustrates an information handling system 100 configured to monitor its power consumption in accordance with at least one embodiment of the present disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

For the purpose of illustration, information handling system 100 is described in an example context of a server chassis with multiple server blades. The techniques described herein can be applied in other information handling system contexts that monitor power consumption without departing from the scope of the present disclosure.

Information handling system 100 includes a power delivery module 10, which includes a plurality of power supply units (PSUs), such as PSUs 11, 12, 13, 14, 15, and 16, a plurality of server nodes (such as server nodes 41, 42, 43, and 44), and a chassis management control module 50. Each PSU of PSUs 11-16 includes a power measurement module (PMM) and an information storage module (ISM), identified as PMMs 21-26 and ISMs 31-36 for PSUs 11-16, respectively.

Information handling system 100 is configured to perform computations to facilitate administration of one or more tasks. For example, server nodes 41-44 can execute one or more software programs to manipulate information, to control manufacturing equipment, to conduct academic research, or to support another desired task. Power delivery module 10 is configured to provide power at a voltage and ampere capacity suitable for the operation of components included at information handling system 100, for example server nodes 41-44 and chassis management control module 50. Chassis management controller 50 is configured to manage aspects of operation of information handling system 100. For example, chassis management controller 50 can monitor the power consumption, such as energy used during a period of time, of information handling system 100 over time, and thus allow a data center to bill an entity, such as a client, for energy costs associated with the client's use of information handling system 100 based on the resulting power consumption information. Such power consumption information is desirable for other purposes, including facility design and administration (such as design of air conditioning and mains power distribution).

Each PSU has an input to receive electric power via a node labeled "MAINS POWER," a bidirectional control interface terminal connected to a node labeled "SMBUS," and an output connected to a node labeled "POWER PLANE." Each server node of server nodes 41-44 has an input to receive power from node POWER PLANE and a bidirectional control interface terminal connected to node SMBUS. Chassis management control module 50 is connected to node SMBUS. Node SMBUS facilitates communication of information between components of information handling system 100 in accordance with an industry-standard System Management Bus (SMBus) serial interface protocol or other suitable protocol. For the purpose of example, six PSUs are illustrated at FIG. 1; however, a greater or lesser number of PSUs can be included at information handling system 100.

In one embodiment, each PSU is compliant with an industry-standard power-management protocol known as Power Management Bus (PMBUS). The PMBUS protocol is implemented over the SMBus protocol, and enables chassis management control module 30 to program, control, and conduct real-time monitoring of each PSU of PSUs 11-16. For example, chassis management control module 50 is configured to periodically query each PSU of PSUs 11-16 to determine an amount of mains power received at the input of a selected PSU via node MAINS POWER (i.e., the input power of the selected PSU). While the SMBUS protocol is used in this example, another standard protocol, or a proprietary protocol or signaling format can be used to implement communication between chassis management control module 50 and PSUs 11-16.

Each server node of server nodes 41-44 can include one or more data processing devices, such as a microprocessor or microcomputer, and each data processing device can include one or more processor cores. Each server node is operable to access a computer-readable medium such as a memory device, which is capable of storing a software program that includes a set of instructions to manipulate at least one processor to perform desired tasks. A server node further can include memory devices, other information storage devices, peripheral interface devices, and the like. Furthermore, a server node can include one or more interfaces (not shown) to support communications and information transfer with another server node, or with other components of information handling system 100 such as shared information storage devices, peripheral interface devices, and the like (not shown at FIG. 1). The SMBus interface is an example of one such interface. In an embodiment, information handling system 100 may include a server rack, and server nodes 41-44 may each represent blade servers.

Chassis management control module 50 is configured to monitor and control components of information handling system 100. For example, chassis management control module can activate and deactivate server nodes in response to a power conservation policy. The amount of power consumed by a respective server node can vary in response to how the corresponding server node is configured, the selection and utilization of associated hardware components, and the type of computations being performed at the server node, amongst other factors. For example, chassis management control module 50 can place one or more server nodes into a power-conservation mode when demand for computational resources does not require the operation of all server nodes.

Chassis management control module 50 includes a power consumption module (PCM) 60. PCM 60 is configured to collect power information associated with the operation of information handling system 100, and to determine corresponding total power consumption for a period of interest based on the power information, such as while information handling system 100 is performing a task associated with a particular client. In the event that PCM 60 fails to collect power information associated with operation of information handling system 100, power delivery module 10 is configured to collect the desired power information until PCM 60 (or another PCM) is once again performing that task and then provide the collected power information to the PCM 60. For example, if PCM 60 fails, or is otherwise temporarily unable to collect power information, each PSU of PSUs 11-16 can collect and store power information representative of input power that the PSU is consuming. At a later time, PCM 60 can retrieve the stored power information from each PSU, and determine a total power consumption of information handling system 100 for the period during which the PCM 60 was unavailable. For example, PCM 60 can determine the total power consumption of information handling system 100, expressed in kilo-watt-hours (kWh) or another metric, corresponding to the utilization of information handling system 100 by a particular client.

Figure 2:
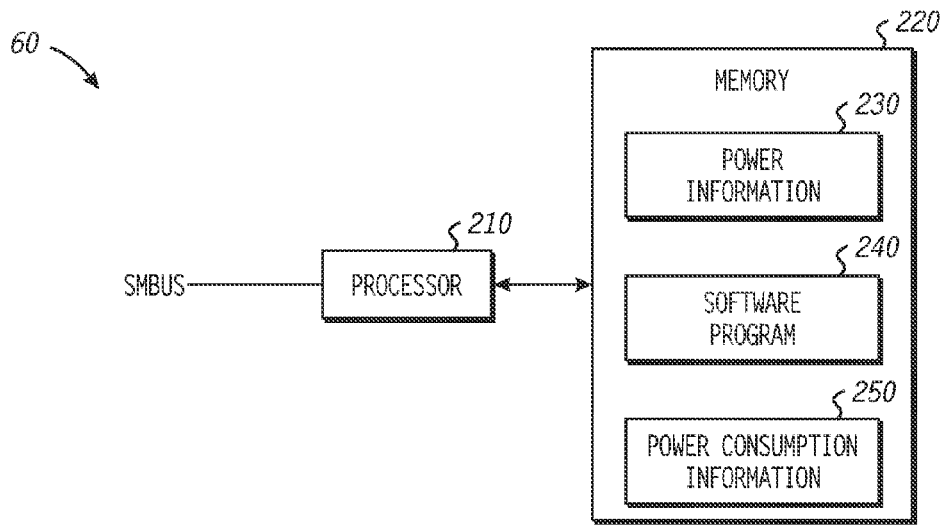
FIG. 2 is a block diagram illustrating a power consumption module of the information handling system of FIG. 1.

FIG. 2 is a block diagram illustrating an example implementation of PCM 60 of FIG. 1 in accordance with a specific embodiment of the present disclosure. PCM 60 can be implemented using dedicated logic devices, by one or more processors configured to execute a software program stored in a computer-readable medium, or a combination thereof. In the illustrated example at FIG. 2, PCM 60 is implemented using a processor (or multiple processors) that executes instructions included in one or more software programs. In particular, PCM 60 includes a processor 210 and a memory device 220.

Processor 210 includes a bidirectional control interface connected to node SMBUS, and a bidirectional data interface connected to memory device 220. Processor 220 is operable to execute software program 240. Processor 210 may be a device that is dedicated to performing only tasks associated with PCM 60, or it may perform additional processing tasks administered by chassis management control module 50 or by another portion of information handling system 100.

Memory device 220 is configured to store power information 230, software program 240, and power consumption information 250. Memory device 220 may include a hard-disk drive, a random access memory (RAM), a non-volatile random access memory (NVRAM), another type of data memory device, or a combination thereof. Software program 240 may also be stored at a read only memory (ROM). Software program 240 includes one or more sets of instructions executed by processor 210 to provide the functionality described herein. In another embodiment, PCM 60 can be partially or fully implemented in hardware using a state machine, hard-coded logic devices, and the like.

Software program 240 is configured to determine a total amount of power consumed (for example energy used during a period of time) by information handling system 100, and further to associate the power consumption information with one or more desired periods of operation of information handling system 100. Power consumption information 250 is based on power information 230 collected by PCM 60 under the control of software program 240. Power information 230 includes results of input power measurements representative of mains power consumed by information handling system 100, and the times at which each power measurement was performed. Software program 240 includes one or more software procedures to calculate an approximate total power consumption of information handling system 100 for a particular period of time of interest based on power information 230. For example, if several hundred input power measurements are performed over a period of one hour, and each measurement indicates that information handling system 100 was consuming 1000 watts at the time the measurement was acquired, then a total power consumption of information handling system 100 for that particular one hour interval is approximately 1 kWh (1000 watts×1 hour).

PCM 60 can account for variations in power consumption over a period of interest by calculating an average based on the value associated with each successive input power measurement and the incremental time between the respective measurements. For example, if ten input power measurements are acquired, one each second, over a period of ten seconds, and each of the first five measurements indicate an input power consumption of 1000 watts, and each of the subsequent five measurements indicate an input power consumption of 500 watts, then the average amount of input power consumed during the ten second interval is 750 watts. Therefore, the total amount of power consumed by information handling system 100 over that ten second interval is approximately 0.00208 kWh (750 watts×10/3600 hours).

Power measurements are performed by a power measurement module (PMM) at each PSU (PMMs 21-26 of PSUs 11-16, respectively), as described below with reference to FIG. 3. The PMM can operate in at least two modes: a request-response mode; and a power recordation mode. While in the request-response mode, the PMM performs power measurements in response to power measurement requests received from PCM 60 (the PSU is operating in a power measurement request mode). While in the power recordation mode, the PMM performs periodic power measurements autonomously (that is, the PMM can perform one or more periodic power measurements independent of a power measurement request from the PCM 60 while in the power recordation mode). A PSU initiates operation in the power recordation mode if the PSU does not receive a power measurement request for a predetermined amount of time, such as a predetermined amount of time since a power measurement request was last received at the PSU. As described below, the PMM switches between the request-response mode and the power recordation mode based on the availability of the PCM 60. For example, PCM 60 is unavailable when it is busy, inoperable, absent from information handling system 100, or otherwise unable to issue power measurement requests.

While available, PCM 60 periodically issues a power measurement request to each PSU via node SMBUS. In response, each PSU performs an input power measurement and provide the requested measured value to PCM 60 via node SMBUS in accordance with the request-response mode. PCM 60 stores the measured value with previous measured values at power information 230. However, it will be appreciated that the chassis management control module 50 may be busy, rendered inoperable, removed from information handling system 100, or otherwise unavailable for some period of time. As such, there will be no power measurement requests for the duration that the chassis management control module 50 is unavailable. Accordingly, to maintain the power consumption information of information handling system 100 during such a duration, each PSU enters the power recordation mode in response to determining a power measurement request has not been received at the PSU for a predetermined amount of time (such as from the last received power measurement request). While operating in the power recordation mode, the PSU performs periodic input power measurements autonomously (independent of power measurement requests from PCM 60) and stores the resulting measurements locally. The PSU continues to perform periodic input power measurements and store the results until the PSU determines that PCM 60 is once again issuing power measurement requests. During an interval of time that a PSU is performing input power measurements without an associated request to do so by PCM 60, each measurement, and the time at which the measurement was performed, is stored at local storage, such as an ISM included at power delivery module 10. Each PSU may include or be associated with a separate corresponding ISM, such as ISM 31 included at PSU 11, or one or more PSUs may share a single ISM to store power measurements. An example implementation of an ISM is described below with reference to FIG. 3.

When a PSU determines that PCM 60 is once again issuing power measurement requests, the PSU issues an alert message to PCM 60 via node SMBUS indicating that the PSU has stored input power measurements that it independently acquired while PCM 60 was off-line or otherwise unable to issue the input power requests. PCM 60 responds to the PSU that issued the alert message by issuing a status request via node SMBUS inquiring as to the reason the alert message was transmitted. The PSU responds to the status message by sending the power information stored at the PSU. In an embodiment, the alert message issued by the PSU can specifically inform PCM 60 that the PSU has stored power information that it would like to provide to PCM 60. In either embodiment, PCM 60 can respond to the alert message and retrieve the stored power information from the PSU when PCM 60 is ready to collect the information by issuing a corresponding request via node SMBUS. Upon retrieval of the stored power information from the PSU, PCM 60 updates power information 230 at memory 220. If chassis management control module 50 was merely busy for a period of time and thus temporarily unable to issue power measurement requests, power information 230 may include previously acquired power information. Alternatively, chassis management control module 50 may have been off-line or removed from information handling system 100, in which case power information 230 typically does not include any prior power information. The alert message, status message, power information transmission, and other communications between a PSU and PCM 60 can be implemented using a conventional or proprietary signaling protocol, such as interrupt request and acknowledge signals and a conventional parallel bus interface.

Figure 3:
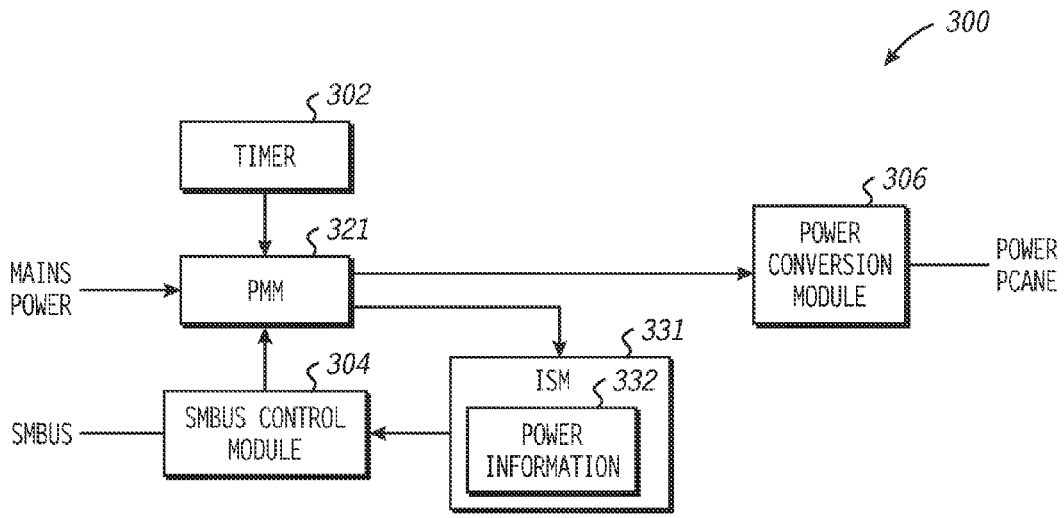
FIG. 3 is a block diagram illustrating a power supply unit (PSU) of the information handling system of FIG. 1 in accordance with a specific embodiment of the present disclosure.

FIG. 3 is a block diagram illustrating a PSU 300 in accordance with a specific embodiment of the present disclosure. PSU 300 (corresponding to PSUs 11-16 of FIG. 1) includes a timer 302, a PMM 321 (corresponding to PMMs 21-26 of FIG. 1), a SMBUS control module 304, an ISM 331 (corresponding to ISMs 31-36 of FIG. 1), and a power conversion module 306. PSU 300, and power conversion module 306 in particular, is configured to convert mains power received at its input into power at a desired voltage or voltages specified for operation of server nodes 40 and other components of information handling system 100 via the node POWER PLANE. PMM 321 has an input to receive power from node MAINS POWER, an input to receive time information from timer 302, a bidirectional terminal for exchanging information with SMBUS control module 304, an output to provide power information 332 to be stored at ISM 331, and an output to provide mains power to power conversion module 306. In an embodiment, the output to provide mains power can be connected to node MAINS POWER directly, such as when PMM 321 uses a passive current transformer to measure a current component of the power information. ISM 331 has an output to provide power information to SMBUS control module 304. Power conversion module 306 has an output to provide power to node POWER PLANE.

Power conversion module 306 can include a switch-mode power converter, a transformer and associated rectification and regulation components, or another type of power conversion circuit. Power is provided to node POWER PLANE and may include voltage references at one or more potentials and with associated current capacities suitable for operating components of information handling system 100. For example, power conversion module 306 may provide a voltage reference at a potential of twelve volts, and another voltage reference at a potential of five volts.

PMM 321 is configured to measure the magnitude of power received at the input (input power) of PSU 300. During typical operation, PCM 60 periodically issues power measurement requests to the PSU 300 via node SMBUS. SMBUS control module 304 receives the power measurement request and forwards the request to PMM 321. While the PSU 300 is receiving the power measurement request, PMM 321 operates in request-response mode. In this mode, PMM 321 performs the requested input power measurement and provides the corresponding measured value to SMBUS control module 304, which forwards the measured value to PCM 60 via node SMBUS. The power information (the measured input power value and corresponding time information) is accumulated as power information 230 stored at memory device 220 of PCM 60.

If PSU 300 does not receive a power measurement request from PCM 60 for a predetermined amount of time, PSU 300 transitions into the power recordation mode of operation wherein PMM 321 independently initiates input power measurements periodically based on time information provided by timer 302. PMM 321 continues to perform periodic input power measurements until a suitable hand-shake protocol with PCM 60 (via SMBUS control module 304) is completed. PMM 321 provides each measured value and a corresponding time that each measurement is performed to ISM 331, where it is stored (power information 332). ISM 331 is a memory device and may include RAM, NVRAM, a hard-disk drive, another type of data memory device, or a combination thereof. The hand-shake protocol performed by PMM 321 and PCM 60 is described below with reference to flow diagrams at FIGS. 5 and 6.

Figure 4:
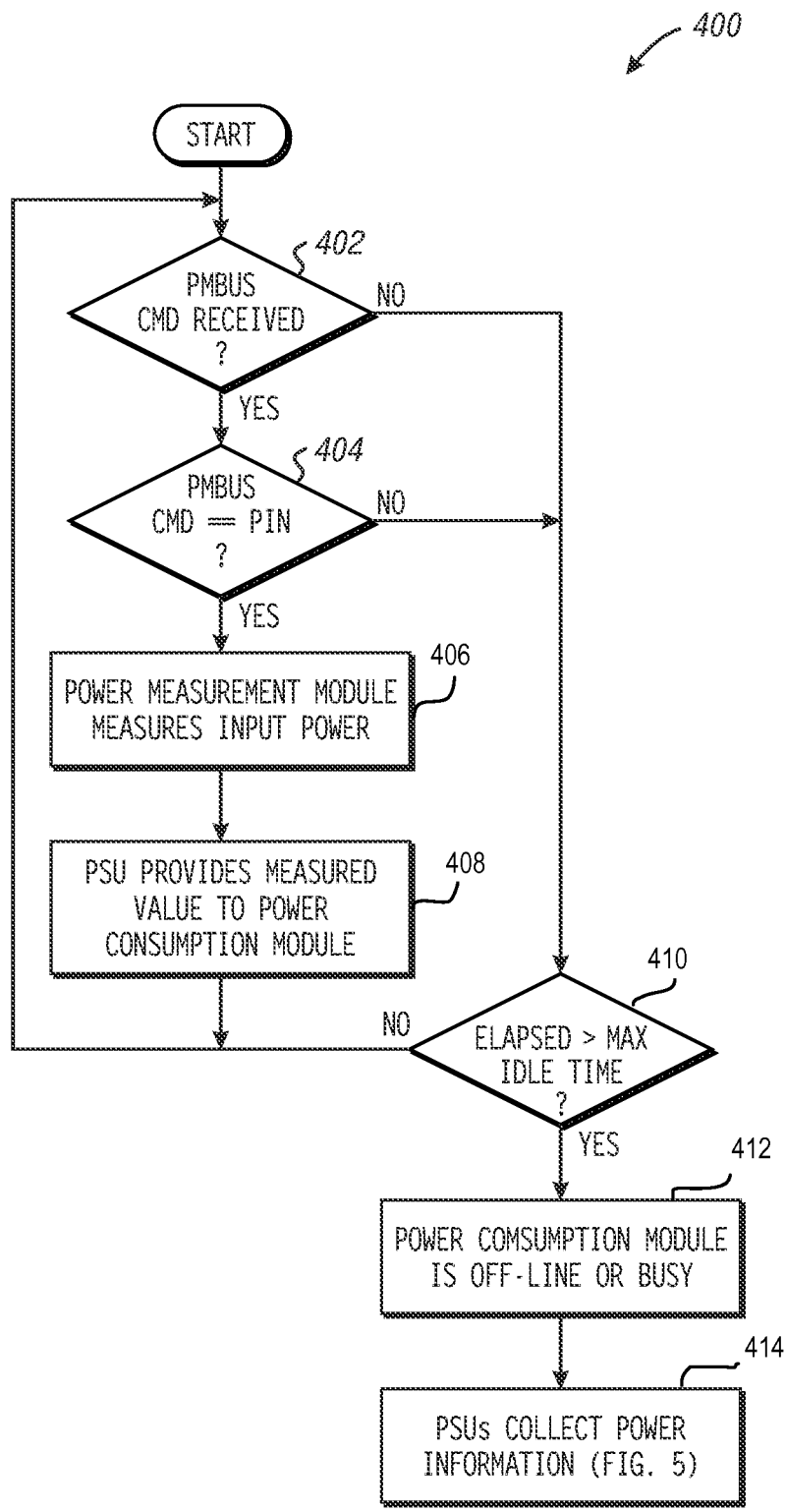
FIG. 4 is a flow diagram illustrating a method for monitoring input power at an information handling system in accordance with a specific embodiment of the present disclosure.

FIG. 4 is a flow diagram illustrating a method 400 for monitoring input power at information handling system 100 in accordance with a specific embodiment of the present disclosure. Method 400 begins at decision block 402 where a PSU, such as PSU 300 of FIG. 3, operates in the request-response mode and monitors commands received at SMBUS control module 304 via the SMBUS interface. If SMBUS control module 304 receives a command, the flow proceeds to decision block 404 where the type of command is evaluated. If the command is a power measurement request, the flow proceeds to block 406 where PMM 321 measures the amount of mains power that PSU 300 is currently consuming. The flow proceeds to block 408 where SMBUS control module 304 provides the measured value to PCM 60 of chassis management control module 50.

If no command is received at SMBUS control module 304 (block 402), or a command is received but it is not a power measurement request (block 404), the flow proceeds to decision block 410. At decision block 410, PMM 321 determines whether a power measurement request has been received before a predetermined amount of time has elapsed since a previous power measurement request was received or since some other reference point (e.g., a power-on reset). If a power measurement request has been received before this time has elapsed, the flow returns to decision block 402. However, if a power measurement request has not been received before the time has elapsed, the flow proceeds to block 412 where PMM 321 determines that PCM 60 is off-line or otherwise unavailable to issue the power measurement request. In response, the flow proceeds to block 414 whereby the PSU 300 enters the power recordation mode and the PMM 321 begins performing periodic measurements of input power based on time information provided by timer 302. The operation of PSU 300 corresponding to block 414 can be better understood with reference to FIG. 5.

Figure 5:
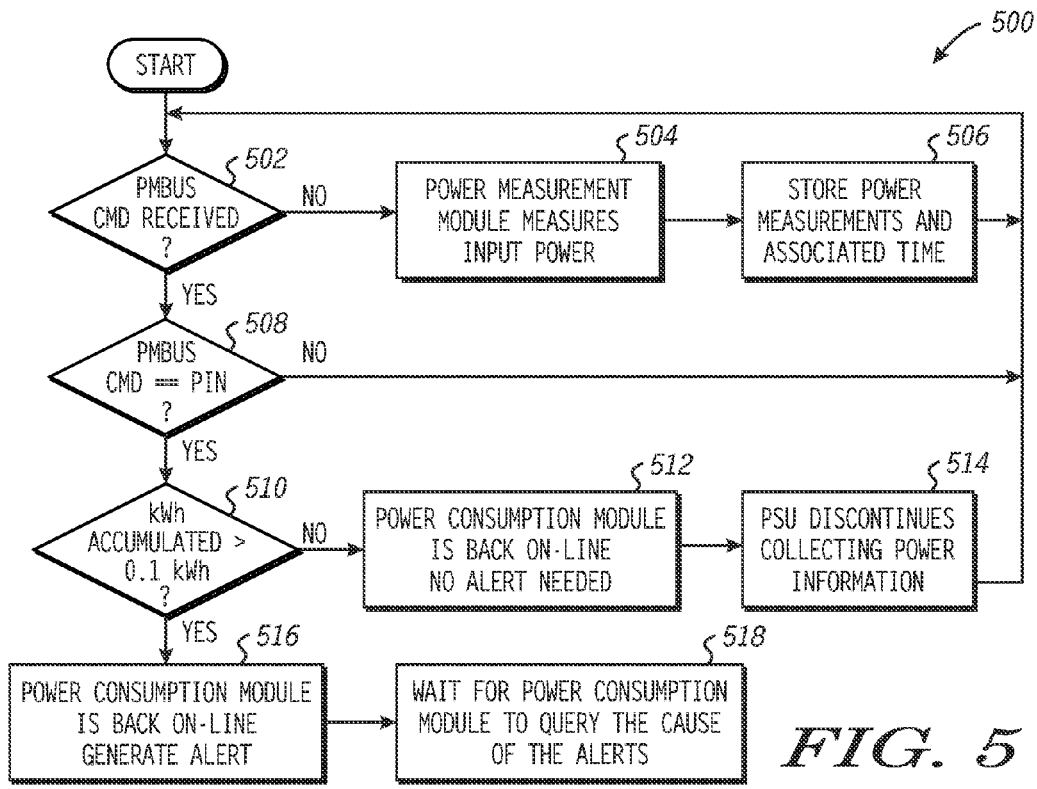
FIG. 5 is a flow diagram illustrating a method for monitoring input power at a PSU and for generating an alert message in accordance with a specific embodiment of the present disclosure.

FIG. 5 is a flow diagram illustrating a method 500 for monitoring input power at a PSU, such as PSU 300, and for generating an alert signal, in accordance with a specific embodiment of the present disclosure. Method 500 corresponds to the process performed at block 414 of FIG. 4. Method 500 begins at decision block 502 where a PSU, such as PSU 300 of FIG. 3, and SMBUS control module 304 in particular, monitors for commands received via the SMBUS interface. In the absence of a power measurement request command, the flow proceeds to block 504 where PMM 321 transitions to operating in a power recordation mode and periodically performs a power measurement. The interval between power measurements is determined by timer 302. For example, PMM 321 can be configured to perform an input power measurement every five seconds. In the power recordation mode, PMM 321 performs a measurement of input power received at PSU 300 via node MAINS POWER independent of receipt of a corresponding power measurement request from the PCM 60. The flow proceeds to block 506 where the resulting power information is stored at ISM 331. The power information can include the value of the measured input power and the time at which the measurement was performed. The flow returns to decision block 502 where PSU 300 continues to monitor for commands received at SMBUS control module 304.

Returning to decision block 502, if a command is received at SMBUS control module 304, the flow proceeds to decision block 506 where SMBUS control module 304 determines whether the command is a power measurement request. If the command is not a power measurement request, the flow returns to decision block 502. If, however, the command is a power measurement request, the flow proceeds to decision block 510. At decision block 510, SMBUS control module 304 determines whether the accumulated power information 332 stored at ISM 331 represents power consumption in excess of a predetermined threshold (e.g., one hundred watt-hours) representing the minimum point at which it becomes practical to account for the power consumed. SMBUS control module 304 can calculate an approximate power consumption represented by power information 332 based on the stored power values and the stored times associated with each power value. If the calculated power consumption does not exceed the predetermined threshold, the flow proceeds to block 512 where SMBUS control module 304 determines that PCM 60 is on-line, and an alert message need not be sent to PCM 60 due to the relatively small power consumption represented by power information 332. The flow proceeds to block 514 whereby PSU 300 exits the power recordation mode and enters the request-response mode in response to determining the PCM 60 is again available. Accordingly, PSU 300 discontinues autonomously acquiring power information (independent of a power measurement request issued by PCM 60) and the flow returns to decision block 502 where SMBUS control module 304 waits for another command.

Returning to decision block 510, if the power consumption represented by power information 332 at ISM 331 does exceed the predetermined threshold, the flow proceeds to block 516 where SMBUS control module 304, having determined that PCM 60 is once again available, generates an alert message, which is provided to PCM 60 via node SMBUS. The alert message notifies PCM 60 that ISM 331 is storing power consumption information for the preceding period during which PCM 60 is unavailable and thus not receiving power information. The flow proceeds to block 518 where SMBUS control module 304 waits for PCM 60 to issue a command to query the reason that the alert message was generated. As previously described, communications between PSU 300 and PCM 60 can be conducted pursuant to another protocol. For example, PSU 300 may be configured to issue an alert message regardless of whether the power consumption represented by power information stored at ISM 331 exceeds a threshold value. In an embodiment, PSU 300 may query PCM 60 to determine if PCM 60 is available.

Figure 6:
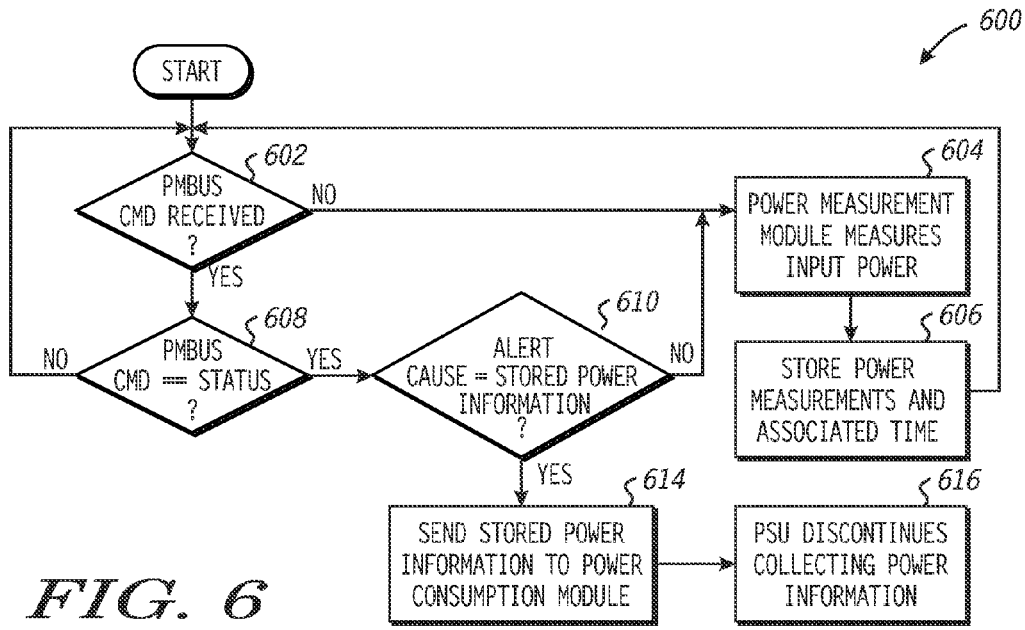
FIG. 6 is a flow diagram illustrating a method for monitoring input power at a PSU and for responding to a status command in accordance with a specific embodiment of the present disclosure.

FIG. 6 is a flow diagram illustrating a method 600 for monitoring input power at a PSU, such as PSU 300, and responding to a status command in accordance with a specific embodiment of the present disclosure. Method 600 corresponds to the process performed at block 518 of FIG. 5 and begins at decision block 602. At decision block 602, if SMBUS control module 304 does not receive a command, the flow proceeds to block 604 where PMM 321 enters the power recordation mode and performs an input power measurement. The flow proceeds to block 606 where the acquired power measurement and time information is stored at power information 332 at ISM 331. The flow returns to decision block 602 where, in the absence of a command, PMM 321 continues to perform periodic input power measurements based on time information provided by timer 302.

Returning to decision block 602, if a command is received at SMBUS control module 304, the flow proceeds to decision block 608, where SMBUS control module 304 determines whether the command is a request for status regarding an alert message previously generated by SMBUS control module 304. If the command is a request for status, the flow proceeds to decision block 610, otherwise the flow returns to decision block 602. At decision block 610, if SMBUS control module 304 did not issue the previous alert message to notify PCM 60 that power information 332 was stored at ISM 331, then the flow returns to block 604, where further input power measurements are performed. If SMBUS control module 304 did issue the previous alert message to notify PCM 60 that power information 332 was stored at ISM 331, then the flow proceeds to block 614, where SMBUS control module 304 sends power information 332 to PCM 60 via the SMBUS interface. The flow proceeds to block 616 where PSU 300 transitions from the power recordation mode to the request-response mode. Consequently, PSU 300 discontinues autonomously acquiring power information (independent of a power measurement request issued by PCM 60) and once again monitors commands received at SMBUS control module 304 (block 402 at FIG. 4).

Thus, while PCM 60 is on-line and operating in a typical manner, PCM 60 routinely issues power measurement requests to each PSU at power delivery module 10. Each PSU returns the requested measured input power value to PCM 60 where they are stored with associated time information as power information 230 at FIG. 2. However, if a PSU does not receive a power measurement request for an interval in excess of a predetermined amount of time, the PSU is configured to operate in a power recordation mode wherein the PSU periodically performs the input power measurements automatically and stores the power information local to power delivery module 10 (such as power information 332 at ISM 331). Subsequently, when chassis management control module is once again on-line and issuing power measurement requests, each PSU having stored power information can provide the stored power information to PCM 60. PCM 60 can use power information 230 to determine power consumption information 250.

Figure 7:
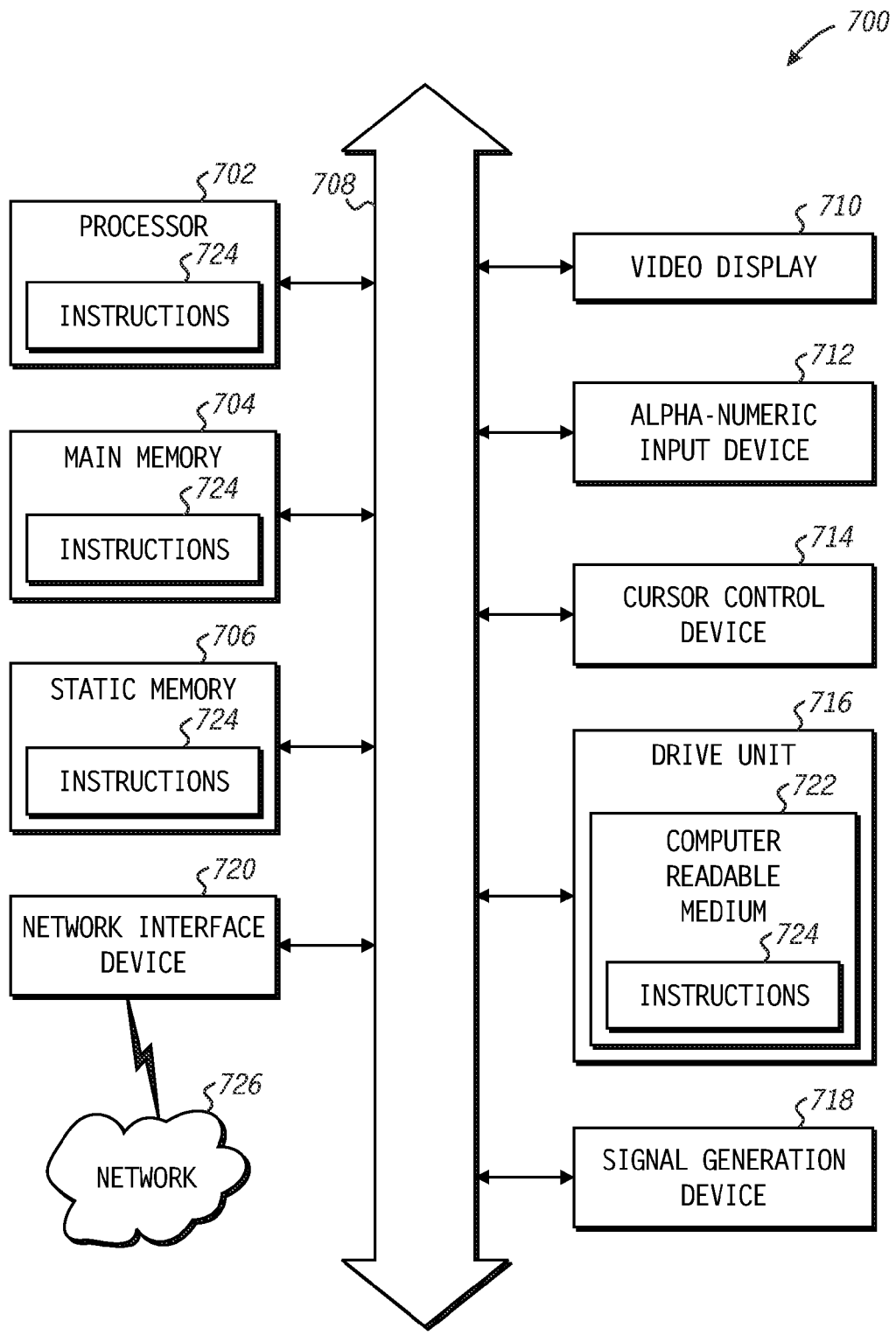
FIG. 7 is a diagram illustrating a general computer system in accordance with at least one embodiment of the present disclosure.

FIG. 7 shows an illustrative embodiment of an implementation of information handling system 100 as a general computer system 700 in accordance with at least one embodiment of the present disclosure. The computer system 700 can include a set of instructions that can be executed to cause the computer system to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a communications device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. In a server rack, a method comprising:
operating a power supply unit (PSU), the PSU to provide power exclusively to the server rack, in a first mode while the PSU determines that a power consumption module of a chassis management control module of the server rack is available, whereby in the first mode the PSU measures a first input power of the PSU and provides a representation of the first input power to the power consumption module in response to receiving a power measurement request from the power consumption module, wherein the chassis management control module is configured to activate and deactivate server nodes of the server rack in response to a power conservation policy; and
operating the PSU in a second mode while the PSU determines that the power consumption module is unavailable, whereby in the second mode the PSU measures a second input power of the PSU and stores a representation of the second input power at the PSU independent of a power measurement request from the power consumption module.

2. The method of claim 1, further comprising:
accessing the representation of the second input power at the PSU and providing the representation of the second input power from the PSU to the power consumption module in response to determining at the PSU that the power consumption module has become available.

3. The method of claim 2, wherein providing the representation of the second input power comprises:
providing an indication that the representation of the second input power is stored at the PSU to the power consumption module in response to determining at the PSU that a power measurement request from the power consumption module has been received at the PSU while the PSU is operating in the second mode; and
providing the representation of the second input power stored at the PSU in response to receiving a request for the representation of the second input power from the power consumption module, wherein the request for the representation is a separate request from the power measurement request.

4. The method of claim 1, further comprising:
determining, at the PSU, that the power consumption module is unavailable in response to determining that a power management request has not been received at the PSU within a predetermined amount of time.

5. The method of claim 4, wherein the predetermined amount of time is a predetermined amount of time from a power management request last received at the PSU.

6. The method of claim 1, further comprising:
determining an amount of power consumed by the server rack based at least in part on the representation of the first input power and the representation of the second input power.

7. The method of claim 6, further comprising:
billing at least one entity based on the amount of power consumed by the server rack.

8. The method of claim 1, further comprising:
determining at the PSU that the power consumption module has become available;
accessing the representation of the second input power at the PSU;
determining that the second input power is in not excess of a predetermined threshold; and not providing the representation of the second input power to the power consumption module based upon the determination.

9. The method of claim 1, wherein:
the PSU and the power consumption module communicate over a System Management Bus;
the providing by the PSU the representation of the first input power to the power consumption module comprises providing by the PSU the representation of the first input power to the power consumption module over a System Management Bus in accordance with a Power Management Bus protocol; and
the power measurement request from the power consumption module is a periodic power measurement request from the power consumption module to the PSU over a System Management Bus in accordance with a Power Management Bus protocol.

10. A server rack comprising:
a power supply unit (PSU) to supply power exclusively to one or more components of the server rack, the PSU comprising:
an interface to receive power measurement requests from a power consumption module of the server rack;
a local storage; and
a power measurement module to:
operate in a first mode while the power measurement module determines that the power consumption module is available, whereby in the first mode the power measurement module measures a first input power of the PSU and provides a representation of the first input power to the power consumption module, wherein both the measuring and the providing are in response to receiving a power measurement request from the power consumption module; and
operating in a second mode while the power measurement module determines that the power consumption module is unavailable, whereby in the second mode the power measurement module measures a second input power of the PSU and stores a representation of the second input power at the local storage, wherein both the measuring and the storing are independent of a power measurement request from the power consumption module.

11. The server rack of claim 10, wherein the power measurement module further is to access the representation of the second input power from the local storage and provide the representation of the second input power from the PSU to the power consumption module in response to determining that the power consumption module has become accessible to the power measurement module.

12. The server rack of claim 11, wherein the power measurement module provides the representation of the second input power to the power consumption module by:
providing an indication that the representation of the second input power is stored at the PSU to the power consumption module in response to determining that a power measurement request has been received at the PSU while the PSU is operating in the second mode; and
providing the representation of the second input power stored at the PSU in response to receiving a request for the representation of the second input power from the power consumption module.

13. The server rack of claim 10, wherein the power measurement module is to determine that the power consumption module is unavailable in response to determining that a power management request has not been received at the PSU within a predetermined amount of time.

14. The server rack of claim 13, wherein the predetermined amount of time is a predetermined amount of time from a power management request last received at the PSU.

15. The server rack of claim 10, further comprising:
the power consumption module, wherein the power consumption module is to determine an amount of power consumed by the server rack based at least in part on the representation of the first input power and the representation of the second input power.

16. The server rack of claim 10, wherein:
the PSU receives power at a first voltage;
the PSU contains a transformer to transform received power to a second voltage; and
the PSU supplies power exclusively to one or more of the other components of the information handling system at the second voltage.

17. The server rack of claim 10, wherein the receiving the power measurement request from the power consumption module comprises receiving the power measurement request from the power consumption module as part of receiving periodic power measurement requests from the power consumption module.

18. In an information handling system, a method comprising:
providing power from a power supply unit (PSU) exclusively to at least one component of the information handling system;
determining, at the PSU, a first amount of power received at the input of the PSU and providing a representation of the first amount of power from the PSU to a power consumption module of the information handling system as first power information in response to receiving a first power measurement request from the power consumption module;
in response to determining at the PSU that a power measurement request has not been received within a predetermined amount of time:
periodically determining an amount of power received at the input of the PSU and storing a representation of the amount of power and a representation of the time at which the amount of power was determined as second power information at a local storage of the PSU;
in response to receiving at the PSU a power measurement request from the power consumption module, providing an indication from the PSU to the power consumption module that the PSU has stored a representation of the second power information; and
providing the representation of the second power information stored at the PSU to the power consumption module in response to receiving at the PSU a request for the representation of the second power information from the power consumption module, wherein the request for the representation is a separate request from the power measurement request.

19. The method of claim 18, wherein the providing the indication comprises issuing an alert message to the power consumption module.

20. The method of claim 19, wherein the request for the representation of the second power information comprises a status request as to the reason for the alert message.

* * * * *